(12) United States Patent
Shiflett, Jr.

(10) Patent No.: US 10,499,623 B2
(45) Date of Patent: *Dec. 10, 2019

(54) PADDLE TRANSFORMER DEVICE FOR FISHING

(71) Applicant: Ronald C. Shiflett, Jr., Midlothian, VA (US)

(72) Inventor: Ronald C. Shiflett, Jr., Midlothian, VA (US)

(*) Notice: Subject to any disclaimer, the term of this patent is extended or adjusted under 35 U.S.C. 154(b) by 18 days.

This patent is subject to a terminal disclaimer.

(21) Appl. No.: 16/035,998

(22) Filed: Jul. 16, 2018

(65) Prior Publication Data

US 2018/0352794 A1    Dec. 13, 2018

Related U.S. Application Data

(60) Continuation-in-part of application No. 15/982,144, filed on May 17, 2018, now Pat. No. 10,159,233, which is a division of application No. 15/245,497, filed on Aug. 24, 2016, now Pat. No. 9,986,725.

(60) Provisional application No. 62/535,432, filed on Jul. 21, 2017, provisional application No. 62/251,515, filed on Nov. 5, 2015, provisional application No.
(Continued)

(51) Int. Cl.
| | | |
|---|---|---|
| *A01K 97/10* | (2006.01) | |
| *A01K 87/00* | (2006.01) | |
| *A01K 87/06* | (2006.01) | |
| *B63B 35/73* | (2006.01) | |
| *B63B 35/71* | (2006.01) | |
| *B63H 16/04* | (2006.01) | |

(52) U.S. Cl.
CPC ............ *A01K 87/007* (2013.01); *A01K 87/06* (2013.01); *A01K 97/10* (2013.01); *B63B 2035/715* (2013.01); *B63B 2035/738* (2013.01); *B63B 2741/00* (2013.01); *B63H 16/04* (2013.01)

(58) Field of Classification Search
CPC ...... A01K 99/00; A01K 87/009; A01K 97/10; B63H 16/04
USPC ...................................................... 43/18.1 R
See application file for complete search history.

(56) References Cited

U.S. PATENT DOCUMENTS

| | | |
|---|---|---|
| 3,039,120 A | 7/1960 | Powell et al. |
| 5,577,338 A | 11/1996 | Matsumoto et al. |
| 5,913,671 A | 6/1999 | Fernandez et al. |

(Continued)

FOREIGN PATENT DOCUMENTS

EP    2387880 B1    3/2013

*Primary Examiner* — Christopher P Ellis
(74) *Attorney, Agent, or Firm* — Marsh Fischmann & Breyfogle LLP; Russell T. Manning (57) ABSTRACT

The present disclosure is directed to a transformer device that attaches to a paddle for fishing. The device may attach to a single or double ended paddle. In any embodiment, the device includes a reel mount that enables a fishing reel to be mounted to the shaft of a paddle. The device also includes a rod mount that removably attaches to a shaft of a paddle. In one embodiment, the reel mount and the rod mount are independently attachable and positionable along a paddle shaft. The rod mount can removably accept and secure a fishing rod including guides for fishing line. One or more rods can be interchangeably coupled to the rod mount. In another embodiment, the rod mount includes a catch for retaining a rod within a ferrule of the rod mount. The device is attachable to a typical paddle to permit fishing while a user propels a watercraft.

15 Claims, 10 Drawing Sheets

FIG. 1A

Related U.S. Application Data

62/238,799, filed on Oct. 8, 2015, provisional application No. 62/209,436, filed on Aug. 25, 2015.

(56) References Cited

U.S. PATENT DOCUMENTS

| | | | |
|---|---|---|---|
| 6,393,753 B1 | 5/2002 | Walker | |
| 9,884,236 B2 * | 2/2018 | Gurney | B63H 16/04 |
| 9,986,725 B2 * | 6/2018 | Shiflett, Jr. | A01K 87/007 |
| 2009/0211142 A1 * | 8/2009 | Sackett | A01K 87/02 43/21.2 |
| 2014/0050584 A1 * | 2/2014 | Lange | B63H 16/04 416/146 R |
| 2015/0150232 A1 * | 6/2015 | Mora | A01K 97/10 43/17 |
| 2015/0327530 A1 * | 11/2015 | Langley | A01K 99/00 43/26 |
| 2016/0069511 A1 * | 3/2016 | Gurney | B63H 16/04 473/517 |
| 2017/0015392 A1 * | 1/2017 | Johnson | B63H 16/04 |
| 2017/0142946 A1 * | 5/2017 | Lockwood | A01K 81/04 |

* cited by examiner

PADDLE TRANSFORMER DEVICE FOR FISHING

RELATED APPLICATIONS

The present application is a continuation-in-part of U.S. patent Ser. No. 15/982,144, entitled, "COMBINATION PADDLE SHAFT AND FISHING ROD," filed on May 17, 2018, which claims priority from U.S. Pat. No. 9,986,725, which claims priority to U.S. Provisional Application No. 62/209,436 having a filing date of Aug. 25, 2015; U.S. Provisional Application No. 62/238,799 having a filing date of Oct. 8, 2015; and U.S. Provisional Patent Application No. 62/251,515 having a filing date of Nov. 05, 2015, the entire contents of all of which are incorporated herein by reference. The present application also claims the benefit of the filing date of U.S. Provisional Patent Application No. 62/535,432 having a filing date of Jul. 21, 2017, the entire contents of which are incorporated herein by reference.

FIELD OF THE INVENTION

The present disclosure is directed to devices that are attachable to a paddle/oar shaft suitable for use with a kayak, canoe or other watercraft. More specifically, the device is directed to a detachable fishing reel seat and detachable fishing rod extension that may be attached to a paddle shaft.

BACKGROUND

Kayaking is becoming an increasingly popular paddle sport. As of 2013, there are an estimated 13 million U.S. kayakers and 10 million U.S. canoeists. International-based paddlers in the EU, South America, Africa and Asia may equal these numbers. When kayaking and canoeing, a paddler typically sits in a low-to-the-water vessel facing forward, legs in front, using a single or double-bladed paddle to pull front-to-back on one side and then the other in rotation. Kayaks and canoes typically have seats positioned within an open or closed hull, although sit-on-top and inflatable kayaks are growing in popularity.

Often, users of kayaks and similar watercraft wish to fish while paddling. Along these lines, a number of kayaks incorporate rod holder(s) that allow mounting a fishing rod to the kayak. In such an arrangement, a user may play out a length of fishing line having a baited hook or lure, place the end of the fishing rod within the rod holder and begin paddling. This allows a user to troll for fish while paddling. However, tending the fishing rod while paddling is often cumbersome and lessens the chance of hooking a fish when the fish strikes the trailing hook/lure. Such multitasking with two platforms (paddle and rod) also increases the probability of hook related snags and punctures of the fisherman. Furthermore, such dual platforms require multitasking demands, which impacts personal labor, observation, stability and safety awareness.

Given the popularity of paddle sports a vast array of different paddles are available to users of kayaks and similar watercraft. Users may choose different paddles for a variety of reasons, including weight, the type of paddling they do, comfort, price, etc. In this regard, these users typically own at least one paddle, with many users owning more than one paddle. Therefore, users wishing to fish while paddling may find it desirable to be able to incorporate fishing equipment such as a rod and reel with their existing paddle(s).

SUMMARY

The presented apparatus or device is directed to fishing attachment for a paddle. The device includes a reel seat including a reel coupling configured to engage a foot of a fishing reel and first and second clamps attached to the reel coupling. The first and second clamps are adapted to at least partially encircle a shaft of the paddle. The device further includes a rod extending between a base end and a tip. The base end of the rod includes a coupling member. The device also includes a rod mount including a paddle clamp that at least partially encircles the shaft of the paddle. The rod mount also includes a hollow tube or ferrule attached to the paddle clamp. The hollow tube/ferrule removably connects to and retains the coupling member of the rod so as to orient the rod along a length of the paddle.

In some implementations the ferrule further includes a slot extending from a first end that is disposed at least partially along a longitudinal axis of the ferrule. In some embodiments, the coupling member is configured to slide along the slot when the base end of the rod is inserted into the ferrule. In other embodiments, the slot can further include a transverse notch configured to permit the coupling member to be rotated from the axial slot to secure the base end of the rod within the ferrule. In an arrangement, the coupling member can include a pin extending radially from the base end of the rod (e.g., relative to a long axis of the rod) and the ferrule can include a slot to removably accept and retain the pin. Implementations of the ferrule can further include a bias force element such as a spring disposed therein where the spring is operative to secure the base end within the ferrule. The spring can bias the coupling member against a notch located in the slot to removably secure the rod within the ferrule. Embodiments also include that the rod mount is positionable along the shaft to dispose the rod to at least partially overlap a blade of the paddle.

In some implementations a fishing kit containing components for attachment to a paddle is provided. The kit can include a reel seat, at least one rod, and a rod mount as described above. In some embodiments, the kit includes a second rod extending between a base end and a tip, where the base end of the second rod includes a coupling member substantially similar to the coupling member of the first rod.

BRIEF DESCRIPTION OF THE DRAWINGS

For a more complete understanding of the present invention and further advantages thereof, reference is now made to the following detailed description taken in conjunction with the drawings in which:

FIGS. 2A and 3B illustrate a perspective views of an embodiment of a rod mount of the paddle transformer device connected to a shaft of a paddle.

FIGS. 7A and 7B illustrate two views of an embodiment of a clamp.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1A:
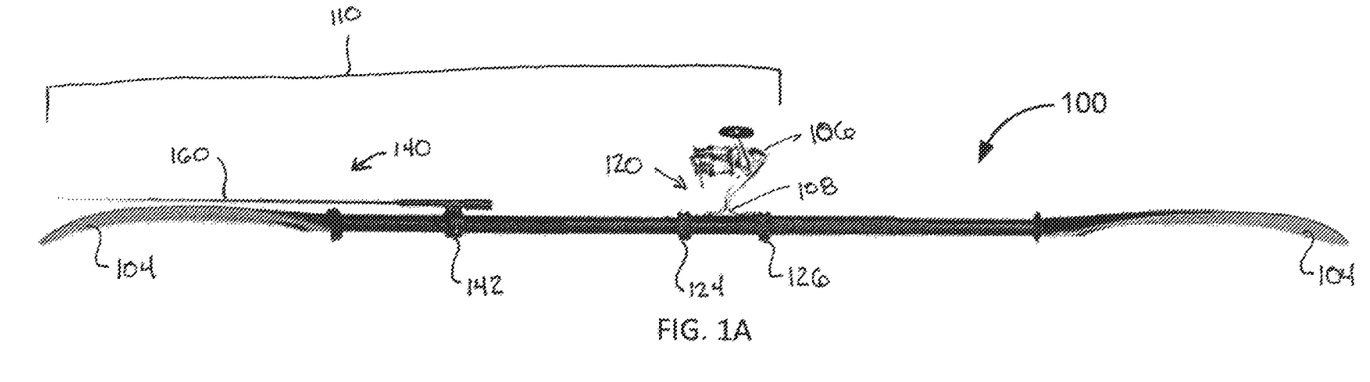
FIG. 1A illustrates a side view of an embodiment of a double ended paddle with a paddle transformer device for fishing attached to the paddle.
Figure 1B:
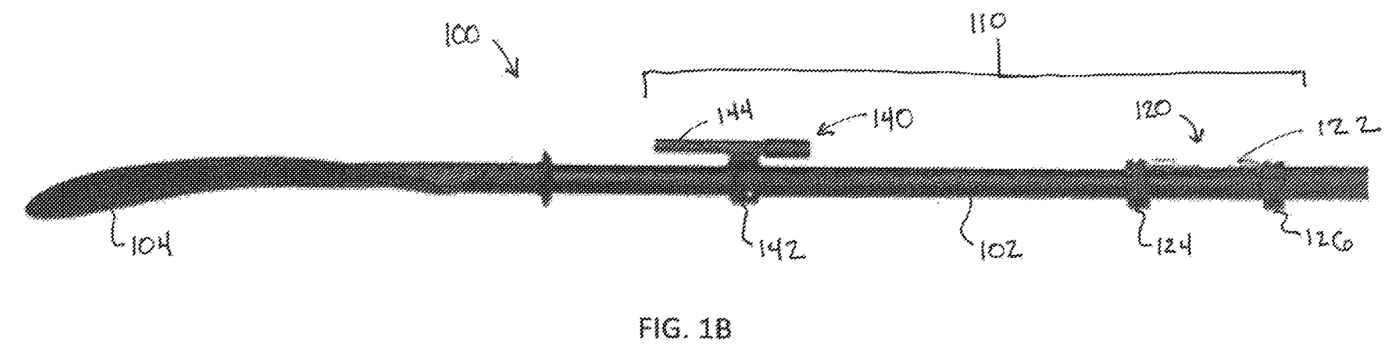
FIG. 1B illustrates an enlarged side view of an embodiment of the double ended paddle with a paddle transformer device for fishing attached to the paddle.

FIGS. 1A and 1B illustrate an embodiment of a paddle transformer device 110 for fishing that attaches to a paddle 100. The paddle transformer device 110 allows a user to attach fishing gear such as a reel and rod segment to a standard paddle such as a kayak paddle to, inter alia, troll for fish while propelling a watercraft through water. Additionally, a user may utilize the device 110 to fish independent of paddling. In the illustrated embodiment, the device 110 is attached to a double-ended paddle 100 having a shaft 102 that extends between first and second oar blades 104. The device 110 includes reel seat 120, rod mount 140 and rod 160. The reel seat 120 and rod mount 140 and rod 160 can be independent components. For example, reel seat 120 can attach to a first location on shaft 102 and rod mount 140 can separately attach to shaft 102. In this regard, reel seat 102 and rod mount 140 can be independently positioned at various locations along shaft 102.

In various embodiments, reel seat 120 attaches to shaft 102 through a first clamp 124 and a second clamp 126. Reel seat 120 has reel coupling 122 for mounting a reel (e.g., reel 106) to shaft 102. In some embodiments reel coupling 122 includes retaining sleeves for coupling to a foot 108 of a reel. Such a reel coupling is well known in the industry. The first and second clamps 124, 126 can be located on each end of the reel coupling 122. In some embodiments, first and second clamps 124, 126 partially encircle shaft 102. In some embodiments, first and second clamps 124, 126 include two semi-circular pieces that can clamp around shaft 102 using one or more fasteners such as a screw. In other embodiments first and second clamps 124, 126 can include, clasps, straps, quick release levers, and/or the like. First and second clamps 124, 126 can be made from any suitable material such as plastic, metal, wood, and/or the like. Devices 110 that are intended to be used in salt-water environments can be made from one or more and/or a combination of corrosion resistant materials such as plastic, stainless steel, titanium, aluminum and/or the like. In some embodiments coated/treated materials such as anodized aluminum can be utilized.

The reel seat 120 can be disposed along the length of the paddle 100 shaft 102. In this regard, a user can position the reel seat 120 in a range of positions. For example, as shown in FIG. 1A the reel seat 120 can be positioned near the midway point between the oar blades 104. Further, reel seat 120 can be disposed to position reel 106 at different radial orientations around shaft 102. For example, as illustrated in FIGS. 1A and 1B reel seat 120 disposes reel 106 such that it is pointing away from where the body of a paddler would be located. Such a location can reduce interference of the reel with a user's paddling motion. However, other orientations of reel seat 102 are possible, such as disposing reel 106 in an upward direction.

Rod mount 140 also removably couples to shaft 102 via paddle clamp 142. In some embodiments paddle clamp 142 can be the same type of clamp as first and second clamps 124, 126 described above. For example, in the illustrated embodiment paddle clamp 142 includes two semi-circular pieces that tighten around shaft 102 through operation of two screws located on opposite sides of the semi-circular pieces. In this regard, tightening the screws causes paddle clamp 142 to tighten around shaft 102 thereby rigidly coupling paddle clamp in a set location on shaft 102. The paddle clamp 140 can be moved to a different location on shaft 102 by loosening and/or removing one or both of the screws and positioning paddle clamp 142 in a new location.

Rod mount 140 also includes ferrule 144 rigidly attached to paddle clamp 142. Ferrule 144 is operative to removably couple with rod 160. In an embodiment, ferrule 144 is a generally hollow tube that receives a tubular end of rod 160. That is, in some embodiments rod 160 is inserted into and retained by ferrule 144 during use. In some embodiments, ferrule 144 orients rod 160 along the length of shaft (e.g., along the shafts longitudinal axis) and may dispose a portion of rod 160 over oar blade 104 as shown in FIG. 1A. In some embodiments rod 60 tip extends past the end of oar blade 104, while in other embodiments rod 60 tip is positioned to be located between the shaft and the end of oar blade 104. That is, a user can position rod mount 140 on shaft 102 to dispose rod 60 and rod tip in a desired location relative to shaft 102 and oar blade 104.

In operation, fishing line (not shown) extends from reel 106 to rod 160. Rod 160 can include eyelets or guides 166 (FIGS. 4A-4C) for disposing and maintaining the fishing line along the length of rod 160. Such guides are well known in the industry. The end of the line extending from rod 160 can be connected to a lure, bait or other fishing tackle. In this regard, a user can let out a desired amount of line using reel 106 and troll the lure/bait while paddling. In some embodiments, the motion of paddling the watercraft may impart a jigging action and/or sporadic jerking motions to the lure helping to impart life-like movement to the lure/bait. When a fish strikes the lure/bait the user can simply set the hook through movement of paddle 100. In some instances, normal paddling motion may even set the hook in a striking fish. Once hooked, a user can play/fight the fish while holding onto shaft 102 and reeling the fish in using reel 106. In this regard, having the paddle transformer device 110 attached to paddle 100 may help landing and/or netting the fish because a user only has the single paddle to control as opposed to attempting to control a paddle, a separate fishing rod and a net.

Figure 2A:
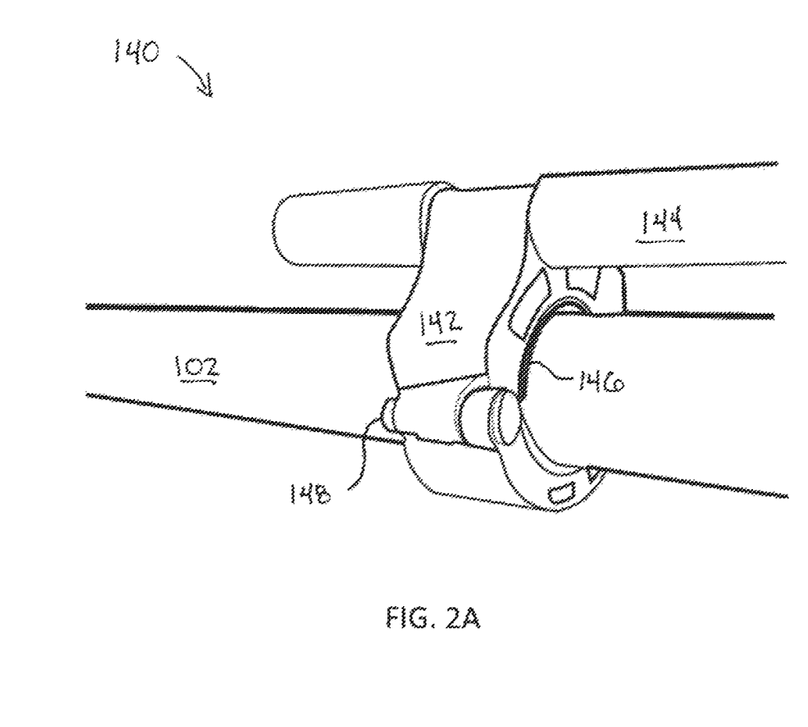
Figure 2B:
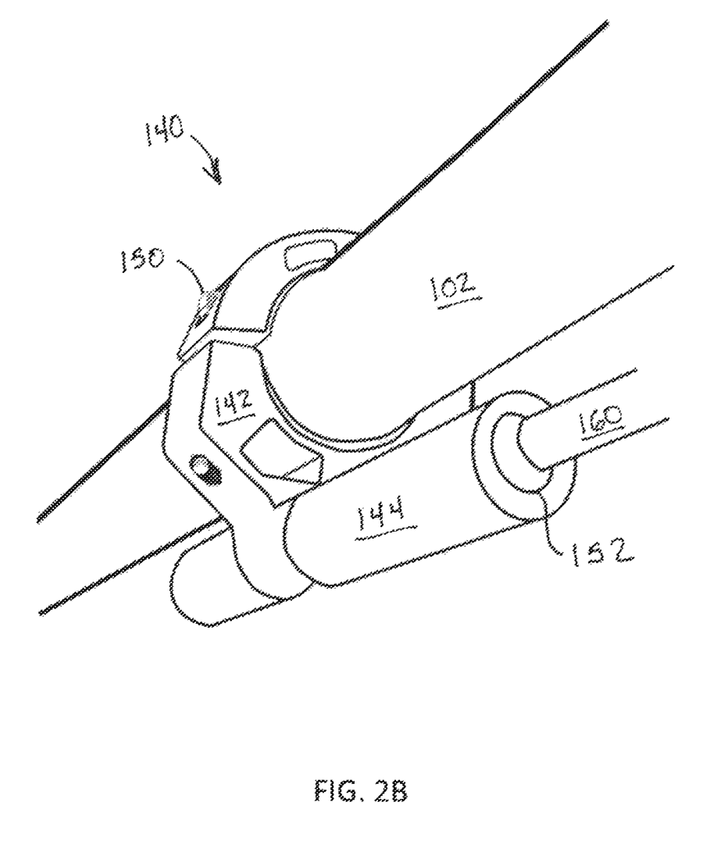

FIGS. 2A and 2B illustrate perspective views of an embodiment of rod mount 140 connected to shaft 102. Embodiments of rod mount 140 include pad 146 disposed between paddle clamp 142 and shaft 102. In some embodiments, pad 146 can be a compliant material such as foam, rubber, plastic and/or the like. In this regard, pad 146 provides an interface between paddle clamp 142 and shaft 102. This may be beneficial for a number of reasons including protecting the shaft 102 from being scratched by paddle clamp 142, and increasing friction between paddle clamp 142 and shaft 102 thereby more securely coupling rod mount 140 to paddle 100. In some embodiments pad 146 substantially encircles shaft 102. In other embodiments, pad 102 may only be disposed along a portion of shaft 102. In some embodiments, pad 146 is bonded/fixed to paddle clamp 142. In this regard, opening or loosening paddle clamp 142 disengages pad 146 from shaft 102.

Embodiments of paddle clamp 142 include hinge 148 for coupling and decoupling paddle clamp 142 to shaft 102. In some aspects hinge 148 is a pin and sleeve mechanism located on one side of paddle clamp 142. In this embodiment, the other side of paddle clamp includes a fastener (FIG. 2B) such as a screw 150. In operation, tightening screw 150 tightens paddle clamp's 142 compression force around shaft 102 by pulling the semi-circular halves of paddle clamp 142 closer together. Loosening screw 150 reduces paddle's clamp's compression force around shaft 102. Continuing to loosen/remove screw 150 disengages the inner surface/pad 146 of paddle clamp 142 from shaft 102. That is the semi-circular halves of paddle clamp 142 can rotate away from each other opening up paddle clamp 142. In this regard, rod mount 140 can be moved to a different location on shaft 102 or removed from shaft 102 altogether.

FIG. 2B further illustrates rod 160 inserted into ferrule 144. In the illustrated embodiment, ferrule 144 includes an annular sleeve 152 having a longitudinal axis that is substantially aligned with paddle shaft 102 when paddle clamp 142 is coupled to paddle shaft 102. In this embodiment, the annular sleeve 152 accepts and secures an end portion of rod 160. That is rod 160, is inserted into sleeve 152 along the longitudinal axis of ferrule 144. In some embodiments rod 160 is retained by friction and/or tapering of annular sleeve 152. As will be described in greater detail below, other embodiments include a retention mechanism such as a pin and slot. Regardless, embodiments include removably attaching rod 160 to rod mount 140 such that rod 160 can be removed from the paddle 100 without needing to remove rod mount 140.

Figure 3A:
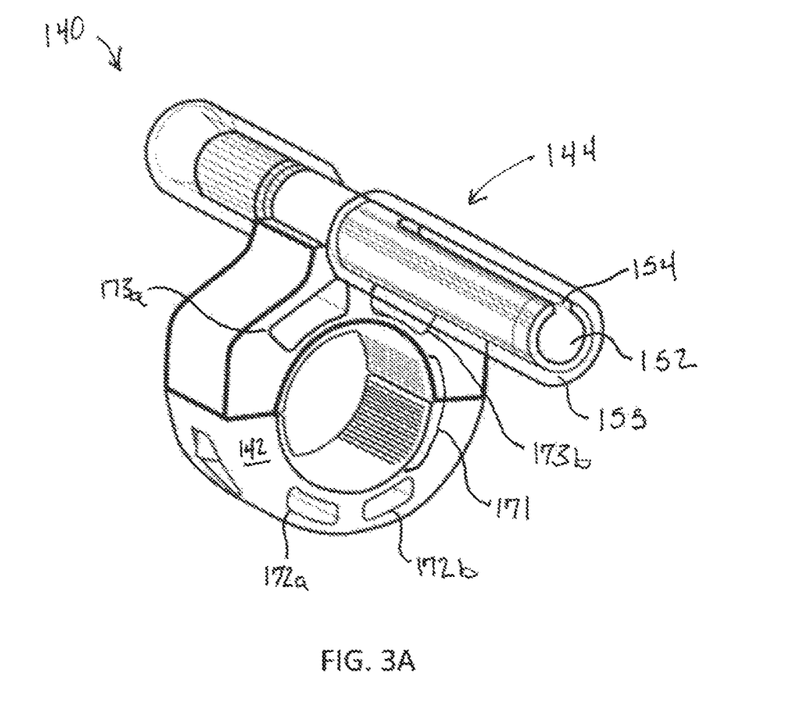
FIGS. 3A and 3B illustrate perspective and front views, respectively, of an embodiment of the rod mount of the paddle transformer device.
Figure 3B:
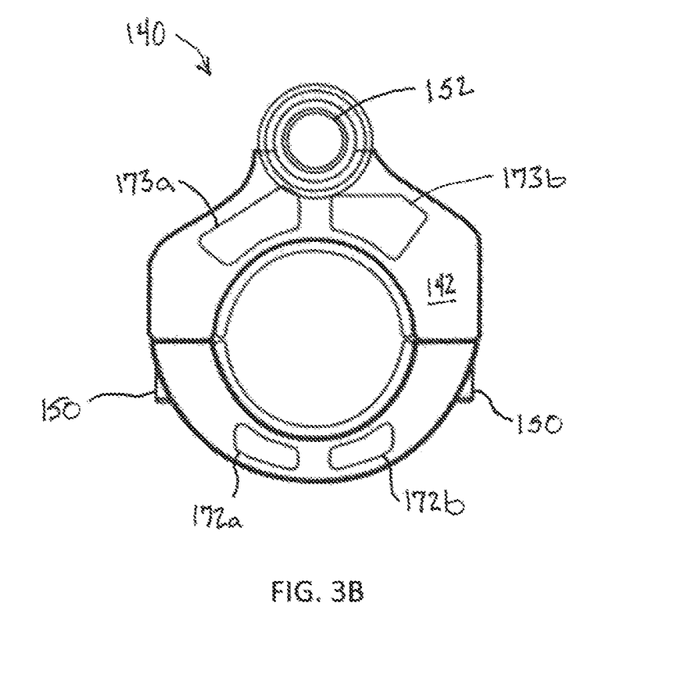

FIGS. 3A and 3B illustrate perspective and front views, respectively, of an embodiment of rod mount 140. In the illustrated embodiment, ferrule 144 includes annular sleeve 152 forming a cylindrical opening extending through ferrule 144. In some embodiments sleeve 152 extends along a portion of ferrule 144, while in other embodiments, sleeve 152 can extend all the way through ferrule 144. Sleeve 152 can include slot 154 extending along a portion of its outer wall. As will be described in greater detail below, slot 154 is configured for accepting a retention mechanism (e.g., pin) located on rod 160. Sleeve 152 can be made from any suitable material such as metal, plastic, composite materials, and/or the like.

As illustrated in FIGS. 3A and 3B some embodiments include surface features 171 along the inner surface 170 of paddle clamp 142. For example, surface features 171 can include a series of ridges disposed circumferentially around paddle clamp 142. In this regard, such surface features 171 can aid attachment of rod mount 140 to shaft 102. Although, ridges are shown, one skilled in the art would recognize that a variety of surface features 171 are possible such as knurling, fluting, and/or the like. Further, surface features 171 can be used independently or in combination with pad(s) 146 described above. In other embodiments, pad 146 can include surface features 171.

Embodiments of the paddle clamp 142 also include apertures 172, 173. Apertures 172, 173 can extend partially or completely through the body of paddle clamp 142. In this regard, apertures 172, 173 may reduce weight of the paddle clamp 142.

Figure 3C:
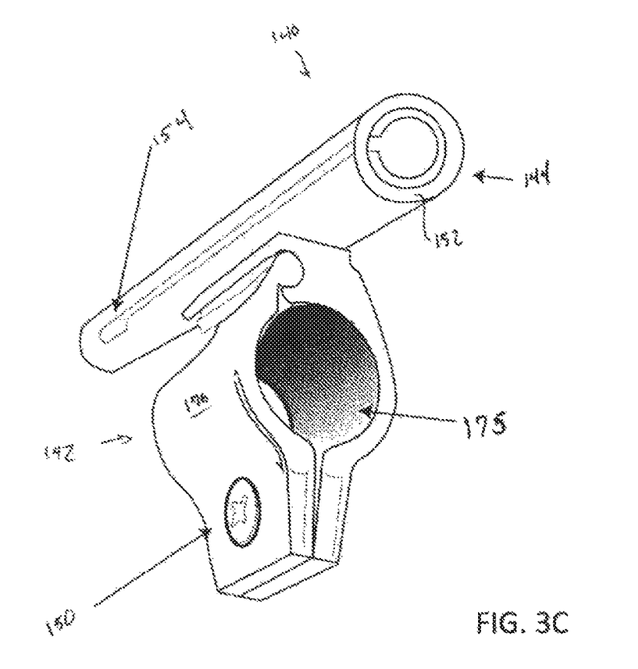
FIGS. 3C and 3D illustrate perspective views of another embodiment of the rod mount of the paddle transformer device.
Figure 3D:
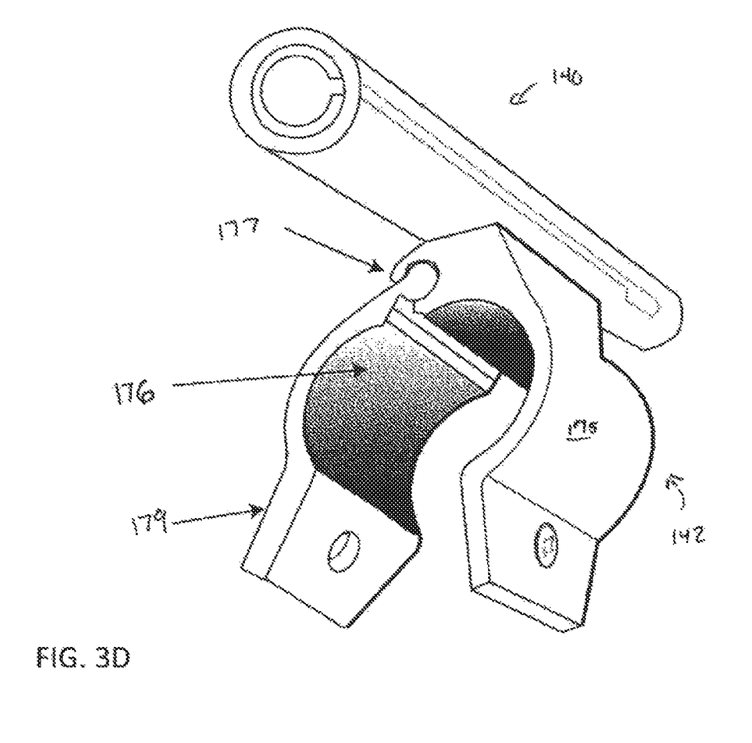

FIGS. 3C and 3D illustrate another embodiment of rod mount 140. In the illustrated embodiment, paddle clamp 142 includes a stationary member 175 and a hinge member 176. The hinge member 176 can pivot about coupling 177 such that the hinge member 176 can rotate away from stationary member 175 to be positioned around paddle shaft 102. Once in a desired position, hinge member 176 can be rotated about pivot 177 toward stationary member 175 to secure/fasten rod mount 140 to paddle shaft 102. A screw 150 can be used to secure the hinge member 176 to stationary member 175. Embodiments include sizing the stationary member 175 and hinge member 176 such that tightening screw 150 causes these members to tighten around paddle shaft 102. In some embodiments, screw 150 is disposed in tabs 179 opposite of ferrule 144. The stationary member 175 can be rigidly coupled to ferrule 144 thereby providing a rigid connection to paddle shaft 102.

Figure 4A:
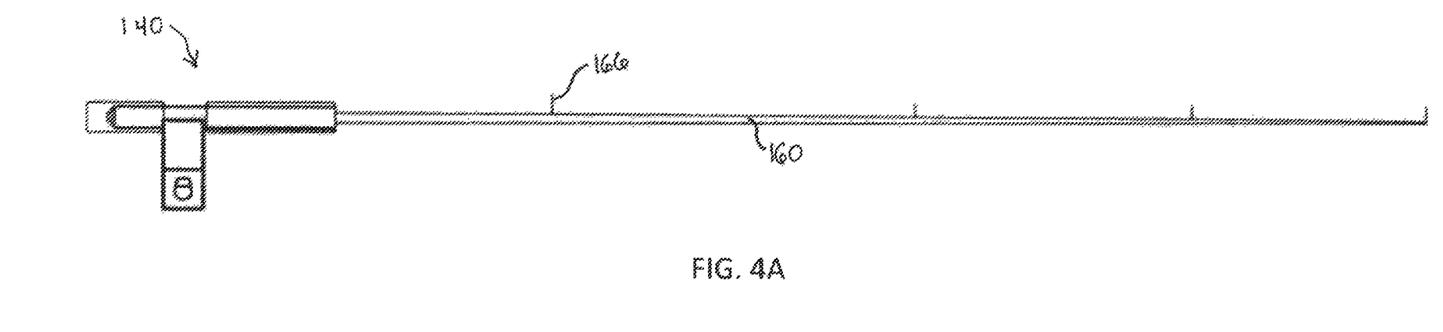
FIG. 4A illustrates a side view of an embodiment of a rod coupled with the rod mount of the paddle transformer device.
Figure 4B:
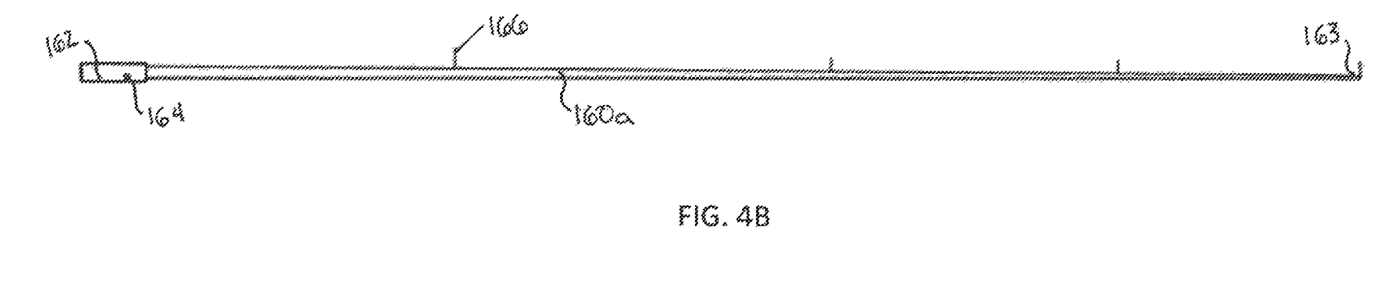
FIGS. 4B and 4C illustrate side views of embodiments of rods that attached to the rod mount of the paddle transformer device.
Figure 4C:
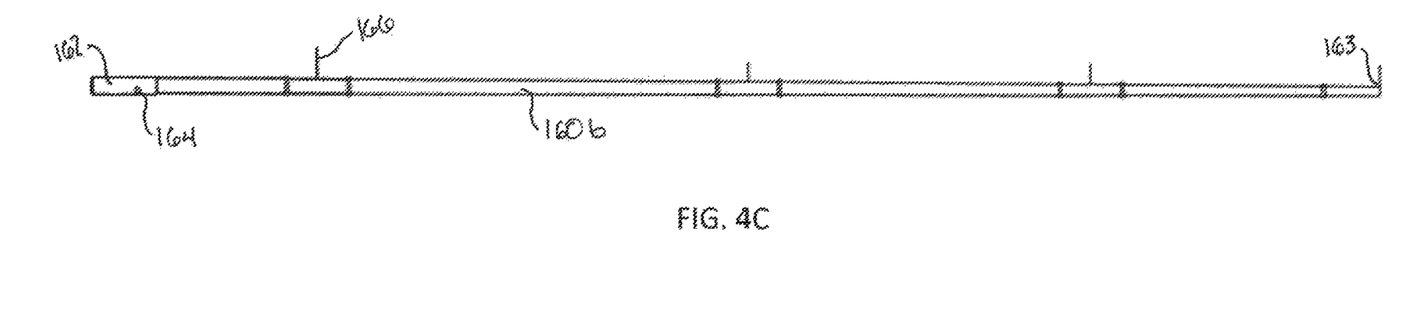

FIG. 4A illustrates rod 160 coupled with rod mount 140, and FIGS. 4B and 4C illustrate embodiments of different rods 160a, 160b that can be interchangeably used with rod mount 140. In various embodiments, rod(s) 160 include base end 162, tip 163, coupling member 164 and eyelets or guides 166. Base end 162 can be cylindrical and sized to slip-fit into sleeve 152 of ferrule 144. In some embodiments base member 162 can taper or fit tightly (e.g., press-fit) into sleeve 152 and be retained within ferrule 144 through frictional means. In some embodiment's base end 162 includes coupling member 164 such as a pin as illustrated in FIGS. 4B and 4C. Coupling member 164 can extend radially outward from the surface of base member. In this regard, as base member 162 is slid into sleeve 152, coupling member 164 (e.g., pin) can slide along slot 154.

Figure 5A:
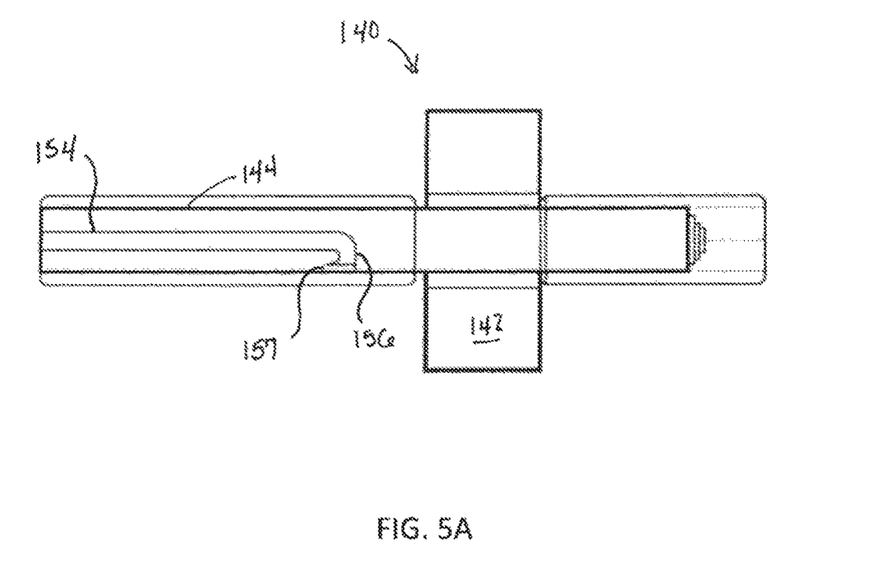
FIGS. 5A and 5B illustrate side and top views, respectively, of an embodiment of the rod mount.
Figure 5B:
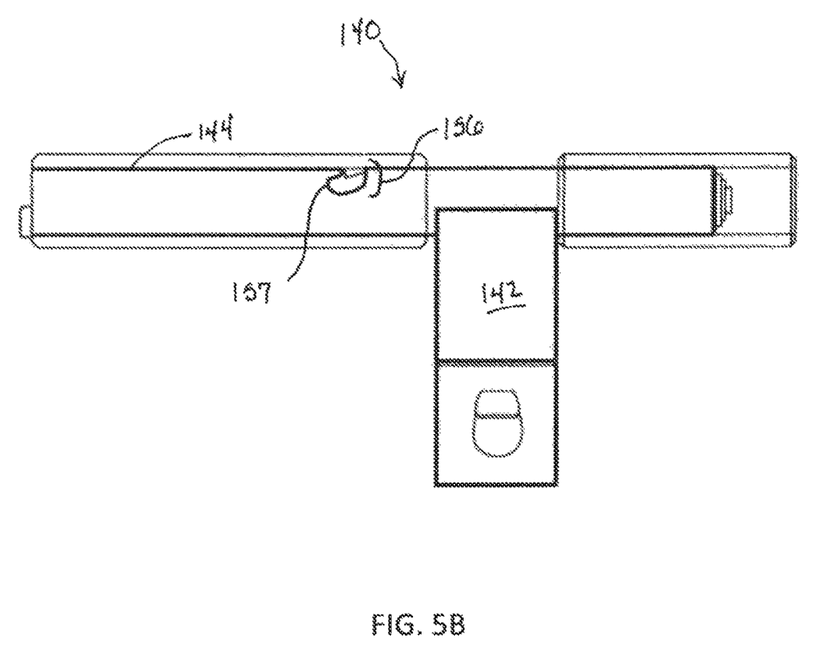

As illustrated in FIGS. 5A and 5B retaining slot 154 formed in the ferrule of rod mount 140 can further include a transverse section or notch 156. As illustrated notch 156 extends transverse from the rearward end of slot 154 and around a portion of ferrule 144. Notch 156 can further include a j-shaped catch section 157. In this regard, coupling member 164 can slide into notch 156 and be rotated into notch 156 and thereby be retained by catch section 157. As such, notch 156 can allow multiple rods 160a, 160b to be interchangeably used with rod mount 140. To couple rod 160 with rod mount 140, base end 162 is slid into sleeve 152 with coupling member 164 (e.g., pin) being aligned with slot 154. As the rod's 160 base end 162 is slid into sleeve 152, coupling member 164 slides along slot 154 until it contacts the end of slot 154. At this point base end 162 can be rotated such that coupling member 164 is disposed within notch 156. More specifically, embodiments include catch 157 as illustrated in FIGS. 5A and 5B which acts to prevent coupling member 164 and base end 162 from sliding out of ferrule 144.

Figure 6:
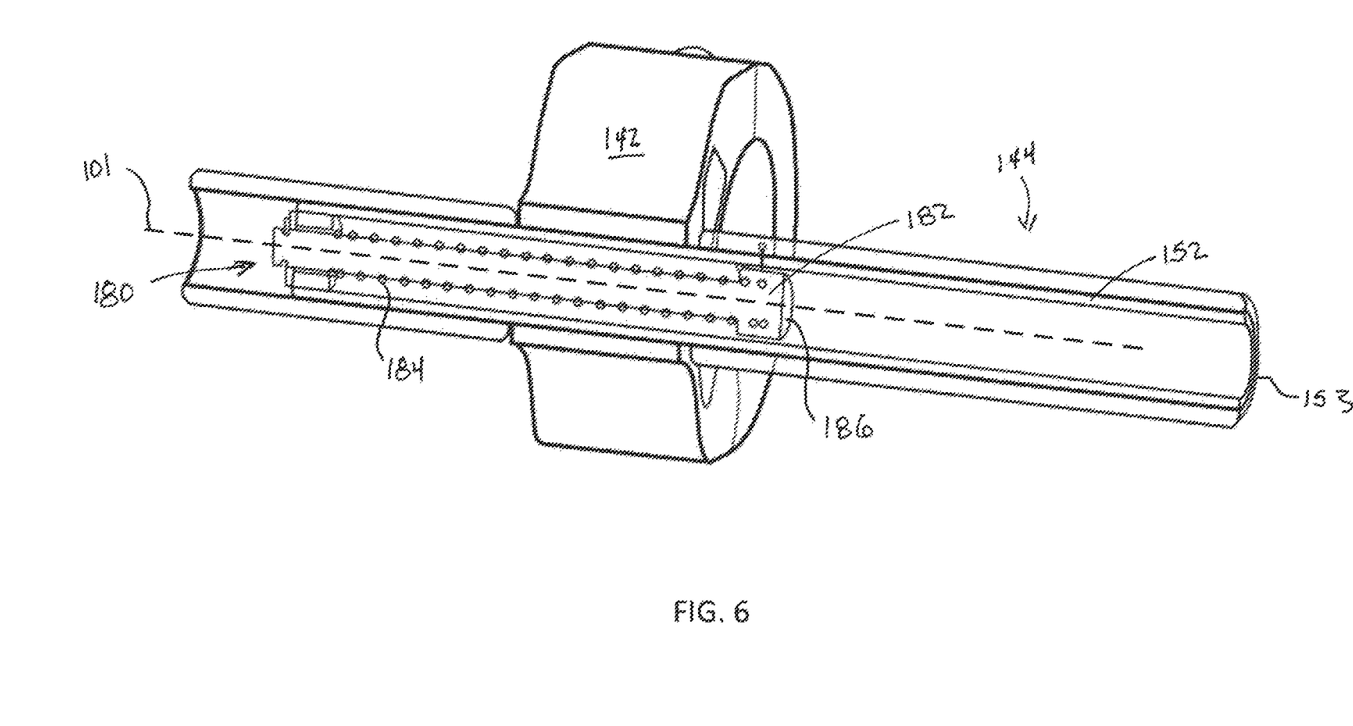
FIG. 6 illustrates a cut-away view of an embodiment of the rod mount.

FIG. 6 illustrates a partial cross-sectional view of an embodiment of rod mount 140 including a spring retainer 180. In operation, spring retainer can be used to apply a force to base end 162 of rod 160 thereby pushing/securing coupling member within catch 157 to prevent un-intended detachment of rod 160 from rod mount 140. Spring retainer 180 can include piston 182 and spring 184. Piston 182 is operative to slide along longitudinal axis 101 of ferrule 144. Spring 184 surrounds and/or is connected to at least a portion of piston 182, and also is fixed to ferrule 144 and/or sleeve 152. In a first state, spring 184 biases piston 182 toward sleeve opening 153. As base end 162 of rod 160 is inserted into sleeve 152, base end 162 contacts front end 186 of piston 182. As base end 162 continues to be pushed into sleeve 152 it pushes piston along longitudinal axis 101 away from sleeve opening 153, thereby creating a compression force in spring 184 that acts against base end 164. During this process coupling member 164 slides along slot 154 as described above. As coupling member 164 contacts the end of slot 152 and is rotated into notch 156, piston 182 and spring 184 push coupling member 164 against catch 157. At this point, spring 184 is at least partially compressed, and as such, continues to bias/push coupling member against catch 157. In this regard, rod 160 is securely and removably coupled with rod mount 140. To disengage rod 160 from rod mount 140, a user can push rod 160 thereby compressing spring 184 and turn rod 160 to dispose coupling member 164 within slot 152. Then, base end 162 of rod 160 can be slid out of sleeve 152.

In some embodiment, rod mount 140 can include other mechanisms for biasing coupling member 164 against catch 157. For example, spring retainer 180 could be replaced with an elastic material such as foam or rubber, which could be compressed by inserting base end 162 into ferrule 144 and then expand to bias coupling member 164 against catch 157. In some embodiments, sleeve 152 can have a closed end opposite sleeve opening 153, and a spring such a helical spring could be positioned against the closed end. In this regard, inserting based end 162 into sleeve 152 would compress the spring against the closed end. As a result, the compressed spring would apply a bias force against based end 162 to lock/bias coupling member 154 within notch 156. In other embodiments other spring mechanisms such as a cantilevered beam located within ferrule 144 could also be used. In some embodiments, a spring mechanism could be located on base end 162 and contact a stationary support located within ferrule 144.

Turning back to FIGS. 4B and 4C, different rods 160a, 160b can be attached to a single rod mount 140 attached to shaft 102. For example, a lighter-weight (e.g., fresh water) rod 160a can have a less stiff/more compliant action. This may be desired by a user when fishing for typically smaller fresh-water fish such as pan-fish, bass, trout, walleye, etc. Additionally, a heavier-weight (e.g., salt water) rod 160b with a stiffer/less compliant action can be attached to rod mount 140. Heavier-weight rod 160b may be desired by a user when fishing for typically larger ocean fish such as tuna, seabass, snapper, mackerel, salmon, etc.

Figure 7A:
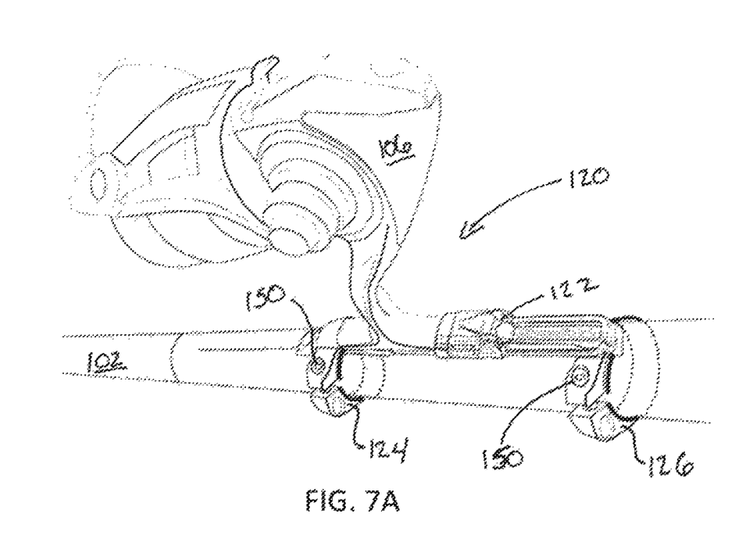
FIGS. 7A and 7B illustrate perspective and top views, respectively, of an embodiment of a reel seat of the paddle transformer device attached to a paddle shaft.
Figure 7B:
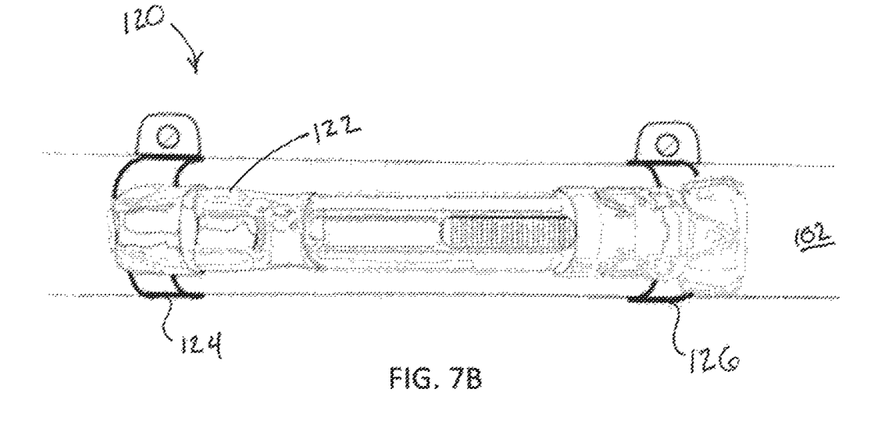

FIGS. 7A and 7B illustrate an embodiment of reel seat 120 attached to shaft 102 of a paddle. As shown reel seat 120 includes first clamp 124 and second clamp 126 each including a screw 150 for tightening first and second clamps 124, 126 around shaft 102. Also, as shown reel coupling 122 can include a sling ratchet mechanism for securing foot 108 of reel 106. In some embodiments, reel coupling can include a screw mechanism for securing foot 108.

Figure 8A:
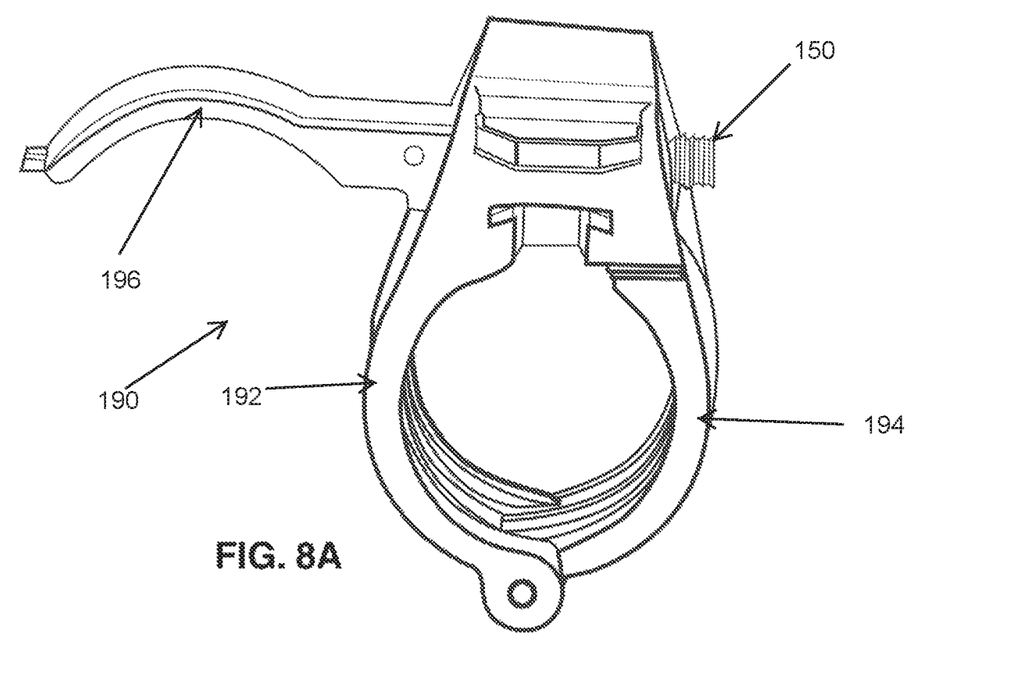
FIGS. 8A and 8B illustrate two views of another embodiment of a clamp.
Figure 8B:
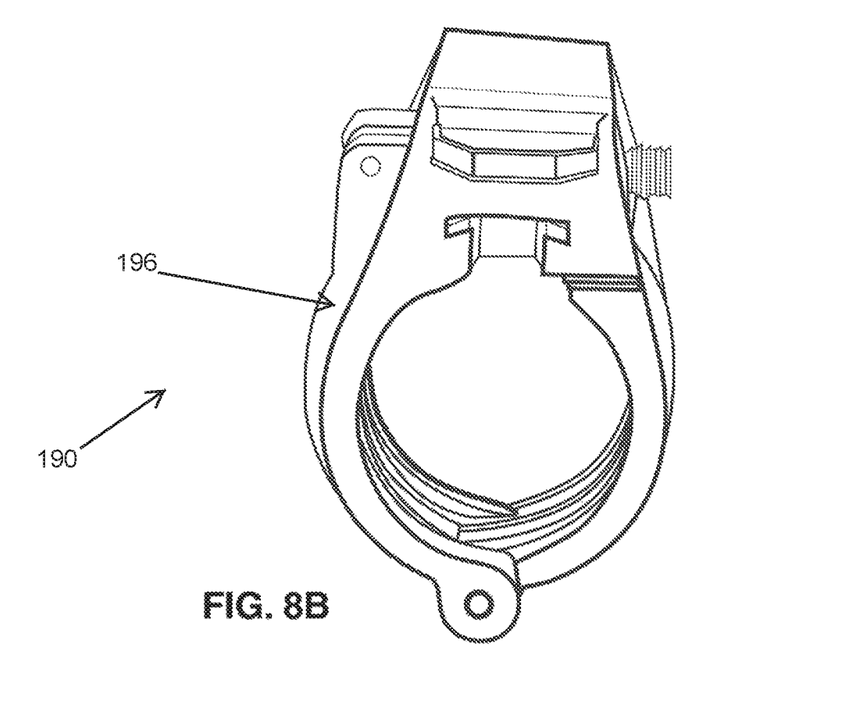

FIGS. 8A and 8B illustrate a further embodiment of a clamp 190 that may be utilized for a reel clamp and/or a rod mounting clamp. As shown, this embodiment of the clamp utilizes a first member 192 and a second member 194 that are hingedly connected at their lower ends. A screw 150 extends through the upper end of the members. The screw engages a nut (not shown) held by the second member. In the present embodiment, the screw 150 is attached to a quick release lever 196. The quick release lever 196 is a camming device that allows for quickly releasing or securing the clamp 190. That is, the lever 196 is pivotally connected to the screw 150 and by lifting the lever 196, the tension on the screw 150 and between the upper ends of the members may be relaxed. See FIG. 8A. In contrast, lowering the lever 196 (see FIG. 8B) results in a camming force that tensions the screw drawing the upper ends of the member 192, 194 together. Further, the lever 196 may be rotated to tighten or loosen the screw prior to camming. Such a clamp is useful for quickly connecting or disconnecting the fishing device to a paddle and/or for rapidly adjusting the fishing device once connected to a paddle.

Embodiments include providing paddle transformer device 110 in a kit. For example, the kit could include reel seat 120, rod mount 140 and at least a first rod 160. Other embodiments of the kit can include reel seat 120, round mount 140, a first rod 160a and a second rod 160b. Embodiments of the kit can also include a reel, fishing tackle and/or the like. In various embodiments, the components of the kit (e.g., reel seat 120, rod mount 140, and rod(s) 160) can be packaged together such as in formed plastic packaging.

Other aspects and embodiments of the paddle transformer device for fishing may comprise any one or more feature(s) disclosed herein in combination with any one or more other feature(s) or a variant or equivalent thereof. In any of the embodiments described herein, any one or more features may be omitted altogether or replaced or substituted by another feature disclosed herein or a variant or equivalent thereof.

Numerous modifications and changes to the embodiments described above will be apparent to those skilled in the art.

What is claimed is:

1. A device for attachment to a paddle having a shaft and an oar blade, comprising:
   a reel seat comprising:
      a reel coupling configured to engage a foot of a fishing reel; and
      at least a first clamp attached to said reel coupling, said first clamp adapted to at least partially encircle the shaft of the paddle;
   a rod extending between a base end and a tip, said base end including a coupling member; and
   a rod mount comprising:
      a paddle clamp configured to at least partially encircle the shaft of the paddle; and
      a ferrule attached to said paddle clamp, said ferrule configured to receive said base end of said rod and engage said coupling member of said rod to orient said rod along a length of the paddle.

2. The device of claim 1, wherein said ferrule further comprises hollow tube, wherein said base end of said rod is sized for receipt in said hollow tube.

3. The device of claim 2, wherein said ferrule further comprises a slot extending through a sidewall of said hollow tube and extending axially from a first end of said hollow tube along a longitudinal axis of said hollow tube.

4. The device of claim 3, wherein said coupling member comprises a pin extending radially outward from said base end of said rod.

5. The device of claim 4, wherein said pin is configured to slide along said slot when said base end is inserted into said hollow tube.

6. The device of claim 3, wherein said slot further comprises a transverse portion disposed toward a rearward end of said slot.

7. The device of claim 2, wherein said ferrule further comprises a spring disposed within said hollow tube, said spring configured to apply a bias force to said base end of said rod.

8. The device of claim 7, wherein said spring biases said coupling member against a notch located in a slot in said hollow tube.

9. The device of claim 1, wherein said rod mount is positionable along the shaft to dispose said rod at least partially over the blade of the paddle.

10. A fishing device having components for attachment to a paddle, comprising:
 a reel seat comprising:
  a reel coupler configured to engage a foot of a fishing reel; and
  first and second clamps attached to the reel coupling, said first and second clamps adapted to at least partially encircle a shaft of the paddle to removably secure said reel coupler to the paddle;
 a rod extending between a base end and a tip, said base end comprising a coupling pin extending radially outward; and
 a rod mount comprising:
  a paddle clamp configured to at least partially encircle the shaft to removably secure said rod mount to the paddle; and
  a hollow tube attached to the paddle clamp, said hollow tube having a receiving slot disposed through a sidewall of the hollow tube and configured to receive said coupling pin when said base end of said rod is disposed within said hollow tube.

11. The device of claim 10, wherein said receiving slot extends axially along said hollow tube.

12. The device of claim 11, wherein said receiving slot further comprises a transverse section at a rearward end of said receiving slot, wherein said pin is configured to slide axially along the receiving slot and rotate into the transverse section.

13. The device of claim 10, further comprising:
 a spring at least partially disposed within said hollow tube, wherein said spring is configured to exert a bias force on said rod when said rod is disposed within said hollow tube.

14. A fishing assembly for attachment to a paddle, comprising:
 a reel seat configured to engage the foot of a fishing reel, the reel seat comprising a clamp for removably attaching to a shaft of the paddle;
 a rod with a pin located adjacent to a base end of said rod, said pin extending radially outward from said rod; and
 a rod mount comprising:
  a hollow tube with an interior configured to receive said base end of said rod;
  a slot disposed though a sidewall of said hollow tube and having a first portion extending, from a forward end of said hollow tube, axially along a length of said hollow tube and a second catch portion that extending transverse from a rearward end of said first portion of said slot, wherein said slot receives said pin when said base end of said rod is disposed within said hollow tube; and
  a bias force member disposed within the hollow tube and configured to engage base end of said rod and provide a force to maintain said pin in said catch portion of said slot.

15. The fishing assembly of claim 14, wherein the bias force member comprises a spring, wherein the spring is compressed upon said base end of said rod being inserted in said hollow tube and said pin being disposed within said catch portion of said slot.

* * * * *